June 14, 1949.   C. L. MILLER   2,472,915
HAND BRAKE LEVER CONTROLLED DOOR LOCKING DEVICE
Filed Jan. 22, 1947
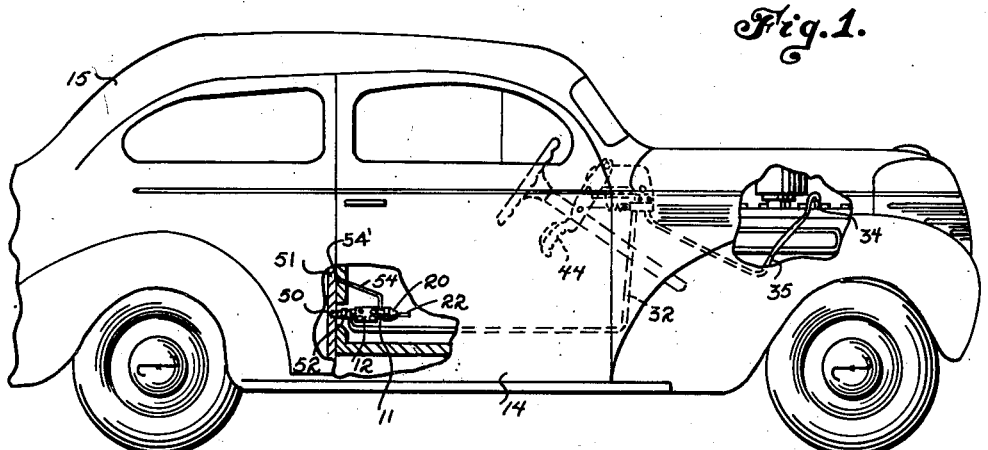
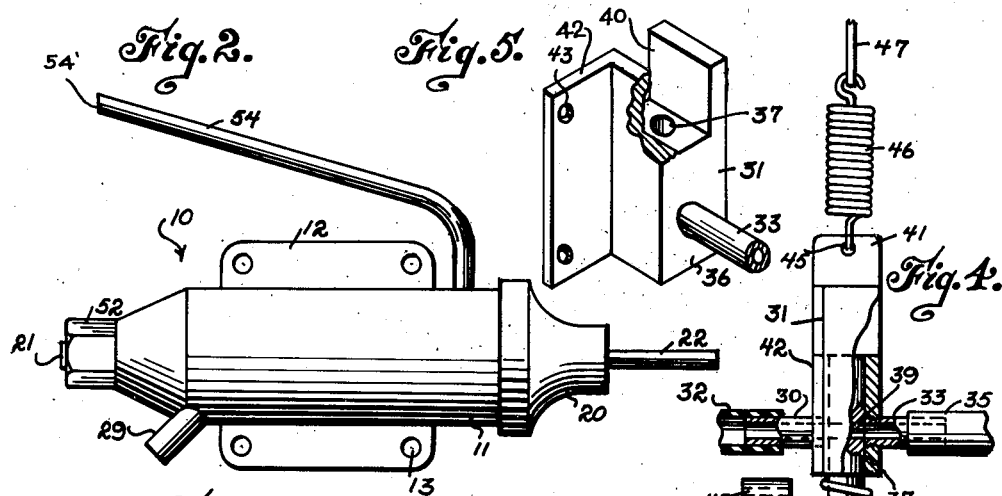
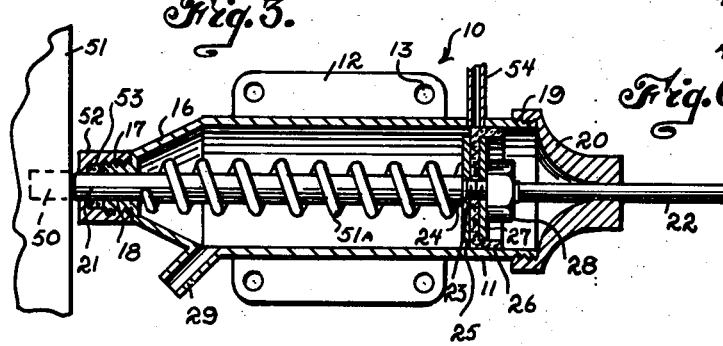
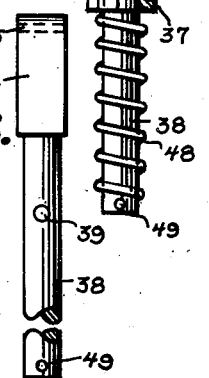
INVENTOR.
Charles L. Miller
BY *Victor J. Evans & Co.*
ATTORNEYS Patented June 14, 1949

2,472,915

UNITED STATES PATENT OFFICE 2,472,915

HAND BRAKE LEVER CONTROLLED DOOR LOCKING DEVICE

Charles L. Miller, Altoona, Pa.

Application January 22, 1947, Serial No. 723,485

1 Claim. (Cl. 180—82)

This invention relates to safety locks for automobile doors and the primary objects of the invention is to provide a lock of this character that is adapted to be operated by the hand brake of an automobile, locking the doors when the hand brake is released, and permitting the doors to be opened when the hand brake has been applied.

Another object of the invention is to provide a lock of this character that is simple in construction and operation, efficient and durable in use and inexpensive to manufacture for the purpose designed.

With the above and other objects and advantages in view, the invention consists of the novel details of construction, arrangement and combination of parts more fully hereinafter described, claimed and illustrated in the accompanying drawing in which:

Figure 1 is an elevational view of an automobile, partly broken away, in order to show the manner of mounting an embodiment of the invention;

Figure 2 is an elevational view of the lock constructed in accordance with the invention;

Figure 3 is a longitudinal sectional view of Figure 2;

Figure 4 is an elevational view partly in section of the valve controlling the lock shown in Figure 2;

Figure 5 is a perspective view of the valve housing shown in Figure 4 and

Figure 6 is an elevational view of the valve shown in Figure 4.

Referring more in detail to the drawing, the reference numeral 10 generally designates the vacuum lock which comprises the tubular housing 11, which is provided with longitudinally extending plate 12 which is apertured at 13 whereby the housing 11 is mounted within the door 14 of the automobile 15.

One end of the housing 11 has a tapered conical shaped end 16 provided with a threaded portion 17 and the portion 17 and end 16 have a continuous bore 18 communicating with the housing 11. The opposite end of the housing 11 is threaded at 19 to receive the tapered conical nut 20. A plunger rod 21 is mounted in the bore 18 at its outer end and its opposite end is provided with a stem 22 which is mounted in the nut 20. The rod 21 is threaded at 23 providing a shoulder 24 forming an abutment for the washer 25 which engages the cup-shaped gasket 26 and a washer 27 engages the opposite side of the gasket and when the nut 28 is threaded on the portion 23, the elements previously described comprise the plunger which is actuated by means of suction.

Such suction is obtained by connecting the outlet pipe 29 on the housing 11 to the outlet pipe 29 on the valve housing 31 by means of the flexible pipe 32, and the inlet pipe 33 of the housing 31 to the intake manifold 34 of the automobile 15 by a flexible pipe 35.

The housing 31 comprises the solid body 36 provided with the longitudinal bore 37 for mounting the valve 38 therein. The valve 38 is in the form of a rod and is provided with a transverse port 39 which will provide communication between the outlet pipe 29 and inlet pipe 33 of the housing 31. The upper end of the body 36 is provided with a guide slot 40 which engages the flattened end 41 of the valve 38 whereby rotation of the valve is prevented, to provide true alinement of the port 39 with the outlet and inlet pipes. A wing 42 on the body 36 is apertured at 43 to receive fastening means whereby the housing is mounted on the automobile adjacent the hand brake lever 44 of the automobile. The valve end 41 is apertured at 45 to receive one end of a coil spring 46, the other end of which is connected by the rod 47 to the hand brake 44, so that when the hand brake is set, the valve will be moved to close communication between the outlet and inlet pipe. The spring 46 cushions the pull of the hand brake on the valve, to prevent strain on the valve. When the hand brake is released, a spring 48 mounted on the valve externally of the housing 31 and retained on the valve by the pin 49 forces the valve to move so that the port 39 is moved into communication with the outlet and inlet pipes.

When the hand brake is released, suction from the manifold 34 causes the plunger assembly to move the rod 21 into engagement with a recess 50 in the door frame 51 of the automobile, and when the hand brake 44 is set, a coil spring 51a on the rod 21 engaging the washer 23 and end 16 of the housing 11 will force the plunger out of the recess 50.

The threaded end 18 of the housing 11 is provided with the packing nut 52, and packing 53, to prevent leakage around the rod 21, and a tube 54, provided with an end opening 54', communicates with the housing 11 permitting oil to be injected into the housing for the lubricating of the gasket 26. The tube 54 also permits any air that accumulates in the housing 11 that would prevent full return of the plunger assembly to escape from the housing. The tube 54 may terminate in any convenient position to present its opening 54' to the atmosphere. A convenient location can be, as shown in Fig. 1, at the edge of the door 14 of the automobile. Thus, access to opening 54' can be had when the door 14 is opened. Due to the normal clearances found between the door frame 51 and the edge of the door 14 when the latter is closed, air may enter, or be expelled from, the opening 54', the air passing through the clearances between door and frame.

When the hand brake is set, the valve is operated to release the plunger, and permit the doors to be opened, but when the hand brake is released, the valve is operated to force the plunger into engagement with the recess 50 in the door frame 51.

It is believed that the operation and safety features of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a lock adapted to be attached to an automobile having a door within a door frame and wheel brakes, the combination of a tubular housing adapted to be secured to the door, a rod reciprocally mounted in said tubular housing and adapted to engage a recess in the door frame to lock the door, a piston means on said rod and mounted for sliding movement in said housing, a spring means about said rod bearing against said housing and piston means for biasing said rod into said housing and out of the door frame recess, conduit means attached to one end of said housing and adapted to be connected to a suction means, a valve body in said conduit means, a valve in said body for controlling communication between said housing and the suction means through said conduit means, a hand brake lever for actuating the wheel brakes, means connecting said hand brake lever with said valve body whereby actuation of said hand brake lever to set the brakes will move said valve to cause the suction means to withdraw said rod from the door frame recess to free the door for opening movement, and a tube connecting the other end of the housing to the atmosphere, said tube also being adapted to receive lubricant for lubricating the piston means.

CHARLES L. MILLER.

REFERENCES CITED

The following references are of record in the file of this patent:

UNITED STATES PATENTS

| Number | Name | Date |
|---|---|---|
| 772,842 | Spencer et al. | Oct. 18, 1904 |
| 2,031,344 | Thomasma | Feb. 18, 1936 |
| 2,198,862 | Chesler | Apr. 30, 1940 |
| 2,254,419 | Castle | Sept. 2, 1941 |